United States Patent [19]

Cooperman et al.

[11] Patent Number: 5,513,134
[45] Date of Patent: Apr. 30, 1996

[54] ATM SHARED MEMORY SWITCH WITH CONTENT ADDRESSING

[75] Inventors: Michael Cooperman, Framingham; Phillip Andrade, Lexington; Richard W. Sieber, Attleboro, all of Mass.

[73] Assignee: GTE Laboratories Incorporated, Waltham, Mass.

[21] Appl. No.: 391,009

[22] Filed: Feb. 21, 1995

[51] Int. Cl.[6] .................................................. G11C 13/00
[52] U.S. Cl. ................. 365/49; 365/189.04; 365/189.05; 365/230.08
[58] Field of Search ................................ 365/49, 189.01, 365/189.03, 189.02, 189.04, 230.01, 230.03, 230.08, 238, 238.5, 189.05

[56] References Cited

U.S. PATENT DOCUMENTS 4,646,271  2/1987  Uchiyama et al. ..................... 365/49

OTHER PUBLICATIONS

Kozaki et al., "32×32 Shared Buffer Type ATM Switch VLSI's for B-ISDN's," IEEE Journal on Selected Areas in Communications, vol. 9, No. 8 (Oct. 1991).
Woodworth et al., "A Flexible Broadband Packet Switch for a Multimedia Integrated Network," ICC (1991).
Katevenis et al., "Weighted Round-Robin Cell Multiplexing in a General-Pupose ATM Switch Chip," IEEE Journal on Selected Areas in Communications, vol. 9, No. 8, (Oct. 1991).

*Primary Examiner*—Terrell W. Fears
*Attorney, Agent, or Firm*—James J. Cannon, Jr.

[57] ABSTRACT

An asynchronous transfer mode switch with shared memory under the control of a content addressable memory, receives serially through a plurality of input ports a plurality of cells of digital data packets during a specific time period, each packet having a header. The header of each said cell is processed and temporarily stored. The data bits of each cell are temporarily stored, and transferred in parallel to a random access memory, using available addresses in said random access memory. A header processor assigns an arrival number to each received cell, and extracts the output port destination and priority of each cell from said headers. A content addressable memory stores the arrival number, output destination port and priority of each data cell. A read control provides sequentially, in order of priority, arrival numbers, and destination addresses, to said content addressable memory for determining the order in which cells of data are read from said random access memory. When a match is found in said content addressable memory, the cell of data from the associated address in said random access is read out to its output destination port under control of said content addressable memory.

9 Claims, 8 Drawing Sheets

ATM SHARED MEMORY SWITCH WITH CONTENT ADDRESSING

BACKGROUND OF THE INVENTION

1. Field of the Invention

This invention pertains generally to the field of Asynchronous Transfer Mode (ATM) switching, and in particular to a shared memory to provide temporary storage of inputs which contend for the same output. Specifically, this invention describes a shared memory ATM switch where the memory is controlled with a content addressable memory (CAM).

2. Description of the Prior Art

Asynchronous Transfer Mode (ATM) switching requires a memory to provide temporary storage of inputs which contend for the same output. Proposed architectures consist of input storage, output storage or shared memory. It has been shown that shared memory architectures provide minimum cell loss probability for a given memory size. However, a shared memory creates a complex memory management problem with time consuming operations since the switch must know the cell location of different inputs, outputs and priorities.

The major requirement in ATM switch fabrics is to deliver the cells to the desired output port with minimum cell loss and minimum delay. Since cells from multiple inputs may be destined for the same output, the cells must be stored in a memory (buffer) until they can be sent to the output. If multiple inputs contend for the same output for a long time, a finite size buffer can overflow and cells are lost. Therefore, efficient buffer management is very important in minimizing cell loss in ATM switch fabrics.

Many papers have been published in the literature on memory management control in ATM switching. One control method uses look-up tables which serve as a directory for cell location in the buffer memory [Takahiko Kozaki, et al, "32×32 Shared Buffer Type ATM Switch VLSI's for B-ISDN's, "IEEE Journal on Selected Areas in Communications, Vol. 9, No. 8, October 1991.]. The disadvantage of this method is that a switch with N inputs and L priorities requires N×L look-up tables. This plus associated control consumes a significant portion of the chip area. Another memory management control technique uses a linked list where each cell contains the location of the next cell [Clark B. Woodworth, "A Flexible Broadband Packet Switch for a Multimedia Integrated Network," ICC 91; Manolis Katevenis, et al, "Weighted Round-Robin Cell Multiplexing in a General-Purpose ATM Switch Chip," IEEE Journal on selected areas in Communications, Vol. 9, No. 8. October 1991]. This scheme has a potential reliability problem since the corruption of one cell can result in a complete breakdown in cell sequence.

It is the principal object of this invention to provide an ATM switch architecture which uses a Content Addressable Memory (CAM) to control the buffer that stores the ATM cells. In this scheme the ID of each cell is stored in the CAM which is interrogated during cell retrieval. CAM-control is reliable, fast, area efficient, and provides extreme flexibility in manipulating cells.

Another object of the invention is to provide an ATM switch with a fully shared memory, and which uses a Content Addressable Memory (CAM) to control the buffer that stores the ATM cells.

It is still a further object of this invention to provide an ATM switch with an output buffered memory, and which uses a Content Addressable Memory (CAM) to control the buffer that stores the ATM cells.

SUMMARY OF THE INVENTION

In a first aspect of the invention, an asynchronous transfer mode shared memory switch has a plurality of input ports to receive serially a fixed plurality of cells of digital data packets during a specific time period, each packet having a header. The header of each said cell is processed and temporarily stored. The data bits of each cell received serially are temporarily stored, and transferred in parallel to a random access memory, using available addresses in said random access memory. The header processor assigns an arrival number to each received cell, and extracts the output port destination and priority of each cell from said headers. A content addressable memory stores the arrival number, output destination port and priority of each data cell. The header and broadcast bits of each said cell are also stored. A read control provides sequentially, in order of priority, arrival numbers, and destination addresses, to said content addressable memory for determining the order in which cells of data are read from said random access memory. When a match is found in said content addressable memory, the cell of data from the associated address in said random access memory is read out to its output destination port under control of said content addressable memory.

In a further aspect of the invention, the random access memory is fully shared.

DESCRIPTION OF THE PREFERRED EMBODIMENT

This invention describes a shared memory ATM switch where the memory is controlled with a content addressable memory (CAM). The architecture consist of input storage and output storage or shared memory. It has been shown that shared memory architectures provide minimum cell loss probability for a given memory size. However, a shared memory creates a complex memory management problem with time consuming operations since the switch must know the cell location of different inputs, outputs and priorities. The invention provides a regular VLSI structure which has high speed and is efficient to implement.

Fully Shared Memory Switch

Figure 1:
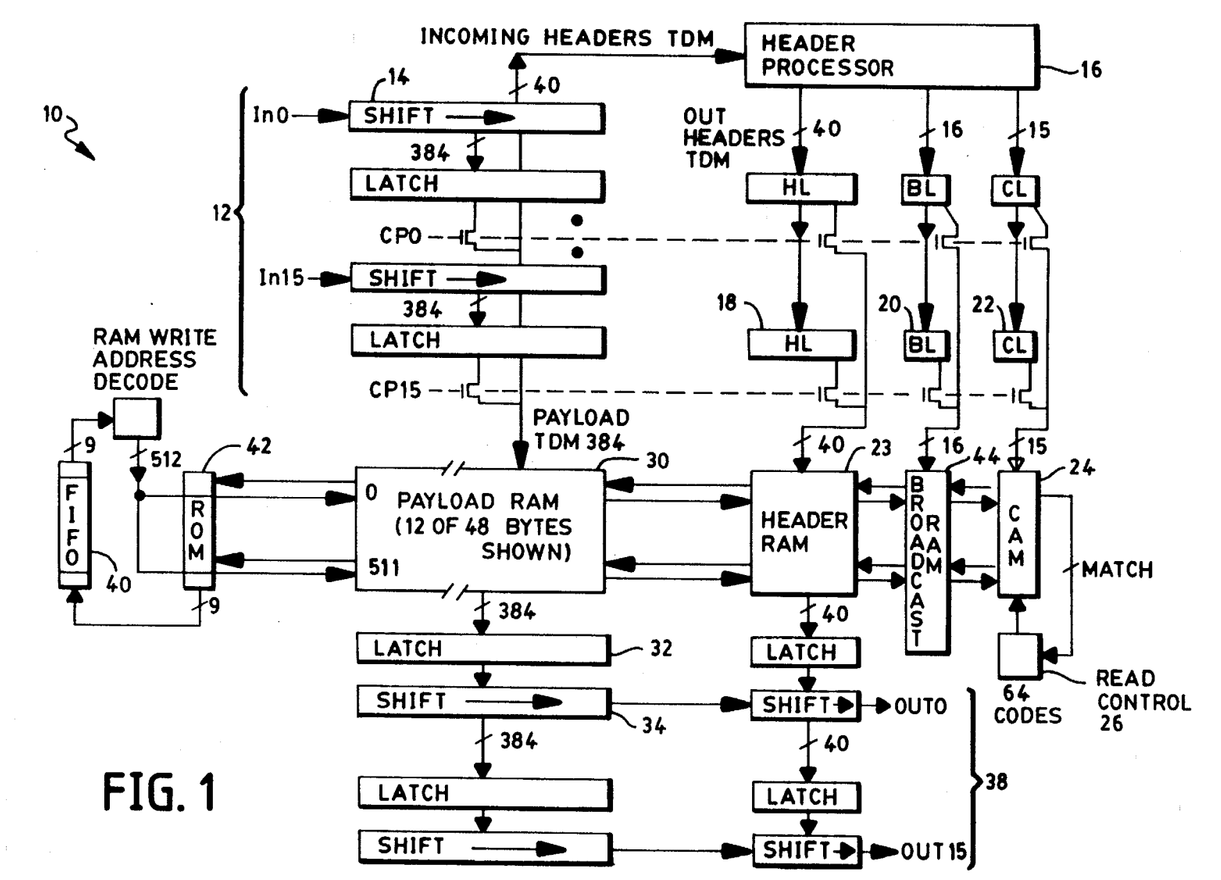
FIG. 1 is a block diagram of a 16×16 ATM shared memory switch using a content addressable memory, according to the present invention.

A block diagram of the ATM switch fabric 10 employing CAM control is shown in FIG. 1. The cells 12 of the 16 inputs In0–In15 are aligned before they enter the switch 10 so that they arrive during a specific time period called a time slot (TS). Assuming a 150 Mb/s bit rate, a bit arrives from each input every 6.6 ns. The five-byte headers enter the shift registers 14 first, and they are stored for processing in the header processor 16. The stored headers are time division multiplexed (TDM) on a forty-bit bus. Each header is processed and written into header, broadcast and CAM latches 18, 20, 22 (HL, BL, CL), and then in parallel to the header RAM 23, broadcast RAM 44, and CAM 24. The incoming cells 12 are converted from serial-to-parallel, while the header processor 16 assigns an arrival number (AN) to each cell, which records its relative arrival. After an AN=511, for a queue of 512 locations, is reached, the numbers repeat. Each output and each priority is numbered separately. Each output and priority combination receives ANs independent of other output-priority combinations. The maximum AN is equal to the number of RAM queue 30 locations, which in this case is 512. This eliminates the possibility of duplicate numbers in a given output-priority combination. When a cell is read out from the RAM queue 30, its queue addresses are written to a FIFO 40 which contains a pool of available queue addresses. The FIFO 40 supplies address locations where cells are written to the RAM queue 30 and CAM 24. The addresses used are stored in ROM 42. After the 53 bytes per input are shifted into the latch 28, the outputs of the 16 registers in the latch 28 are time division multiplexed (TDM) on a (384+40) bit bus. Since the available time to write into the RAM is 53×8× 6.6=2798.4 ns, each cell has 1/16 of this time (i.e. 174.9 ns) to write into the RAM 30.

During the next time slot (N+1), 16 addresses are supplied by the FIFO 40 to write 16 cells into the RAM 30 and CAM 24. The FIFO 40 is initially loaded with addresses 0 to 511.

The information written into the CAM 24 consists of a 4 bit destination address (DA), 2 bit priority code (PR) and a 9 bit cell arrival number (AN). These three numbers will be used later to locate cells in the RAM 30.

Each CAM 24 location contains a cell destination (CD), a cell priority code (PR), and a cell arrival number (AN). A read control 26 addresses the CAM 24 with an address consisting of the AN, an output number, and a priority. During time slot (N+2), the CAM 24 is searched for a specific DA, PR and AN combination. This is done by sending sequentially into the CAM 24 destination numbers 0000 to 1111 with the highest priority code (00) and the cell arrival number. The following events take place:

1) The CAM 24 location containing destination M activates its read line causing reading of the RAM 30 and ROM 42, which contains the addresses of RAM 30. The ROM 42 address corresponds to the RAM 30 address where the cell is located.

2) The 53 byte cell with destination M is read out of the RAM 30.

3) The RAM address of the detected cell is written into FIFO 40.

4) The AN number is incremented by a value of 1.

When the CAM 24 detects a combination of CD, PR and AN, it outputs a "match" signal which addresses its associated shared memory location in RAM 30, where all the remaining cell information is located. The matched CAM location produces a pulse which reads one cell in parallel from the corresponding RAM queue location 30. The parallel output from the RAM queue 30 is converted back to serial format in latch 32 and shift register 34, as the final output 38 Out0–Out15. The cell is then sent to the appropriate output port and its memory address in RAM 30 is made available for other incoming cells. The CAM 24 controls the buffer RAM 30 that stores the ATM cells. In this scheme the ID of each cell is stored in the CAM 24 which is interrogated during cell retrieval. CAM-control is reliable, fast, area efficient, and provides extreme flexibility in manipulating cells.

The process is repeated for the next lower priorities, 01, 10, and 11.

Broadcasting is accomplished by the broadcast RAM 44 which contains a sixteen-bit table indicating to which outputs a cell should be sent. For cells being broadcast, the destination code is 0000 and two or more of the sixteen bits in the broadcast table are a "one". The sixteen bits are decoded and connect the cell to the appropriate outputs. The utilized output destinations are eliminated from the sixteen bits in the broadcast table, and the AN number is incremented by a value of 1.

The operation of the switch with shared memory is further explained with a 4×4 ATM switch example having inputs A, B, C, D and outputs 1, 2, 3, 4. The arriving cells, their priorities and output destinations are listed in Table 1. The time slot number indicates the time of arrival sequence.

TABLE 1

| Time slot | Cell at InA | Priority PR | Output | Cell at InB | Priority PR | Output | Cell at InC | Priority PR | Output | Cell at InD | Priority PR | Output |
|---|---|---|---|---|---|---|---|---|---|---|---|---|
| 1 | A1 | 1 | 3 | B1 | 1 | 1,2,3 | C1 | 1 | 3 | D1 | 2 | 2,3 |
| 2 | A2 | 1 | 2,3,4 | B2 | 1 | 2 | C2 | 1 | 3 | D2 | 1 | 4 |

In the header processor 16 the cells are subdivided into categories as shown in Table 2. Cell A1, the first cell to arrive, is in category [PR=1 and out=3], hence it is given an AN=1. Cell B1 arrives at the same time as A1 and is the first to arrive in category [PR=1 out=broadcast], hence it is also given an AN=1. Cell C2 is the third arrival in category [PR=1, out=3], hence it is assigned as AN=3.

TABLE 2

| | PR1 OUTPUTS | | | | | PR2 OUTPUTS | | | | |
|---|---|---|---|---|---|---|---|---|---|---|
| AN | 0 | 1 | 2 | 3 | 4 | 0 | 1 | 2 | 3 | 4 |
| 1 | B1 | | B2 | A1 | D2 | D1 | | | | |
| 2 | A2 | | | C1 | | | | | | |
| 3 | | | | C2 | | | | | | |

Cells are sent to the output 38 by reading the first cell (not yet sent) in each category (column) in Table 2. Cells are read from left to right starting with PR=1, out=0 in each time slot. A maximum of four cells are read during a time slot. If a cell is broadcast to N outputs, then only 4-N additional cells are read to supply all four outputs. Reading of a broadcast cell in PR=2 is postponed until all cells in PR=1 have been read.

Using this algorithm the outputs are as shown in Table 3. During TS(N), cell B1 is read and broadcast to outputs 1, 2, 3. On-chip logic skips the next two columns in Table 1 since they contain no cells, and prevents reading of A1 since output 3 has already been used by cell B1 during TS(N). Cell D2 is read, since output 4 is available. During TS(N+1), reading starts again from the extreme left. Cell A2 is now the first cell (not yet read) in this column, hence it is read and sent to outputs 2, 3, 4. On-chip logic skips the next two columns since they contain no cells. At this point, cells with PR=2 are considered for output 1. However, since no cells are available for output 1, a fill cell (F) will be sent to output 1. During TS(N+2), cell B2 is read followed by cell A1. During TS(N+4) cell D1 is read.

TABLE 3

| TIME SLOT | OUTPUTS | | | |
|---|---|---|---|---|
| | 1 | 2 | 3 | 4 |
| N | B1 | B1 | B1 | D2 |
| N + 1 | F | A2 | A2 | A2 |
| N + 2 | F | B2 | A1 | F |
| N + 3 | F | F | C1 | F |
| N + 4 | F | D1 | D1 | F |

Figure 2:
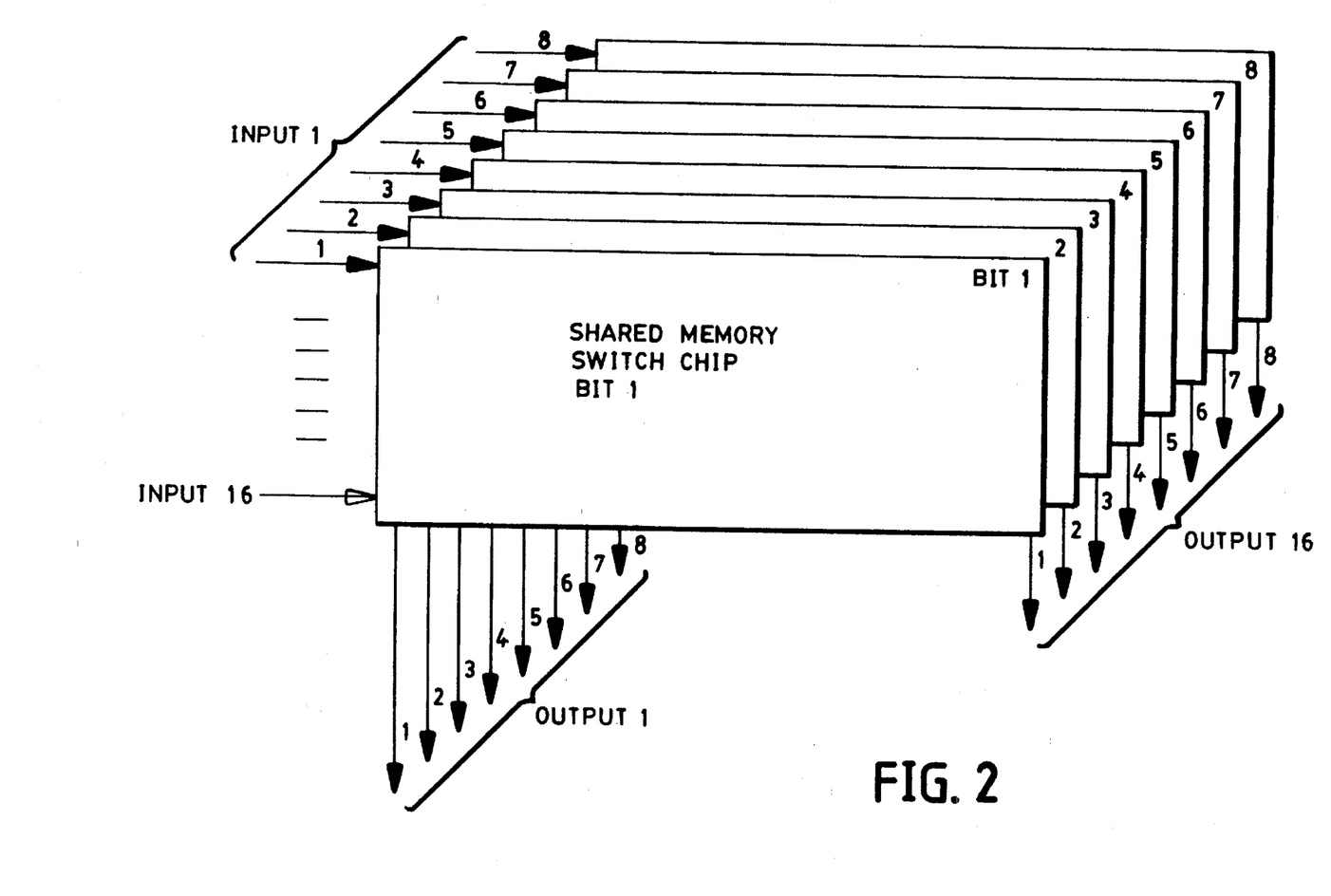
FIG. 2 is a diagrammatic presentation of a bit-partitioned ATM shared memory with on-chip CAM control, according to the present invention.
Figure 3:
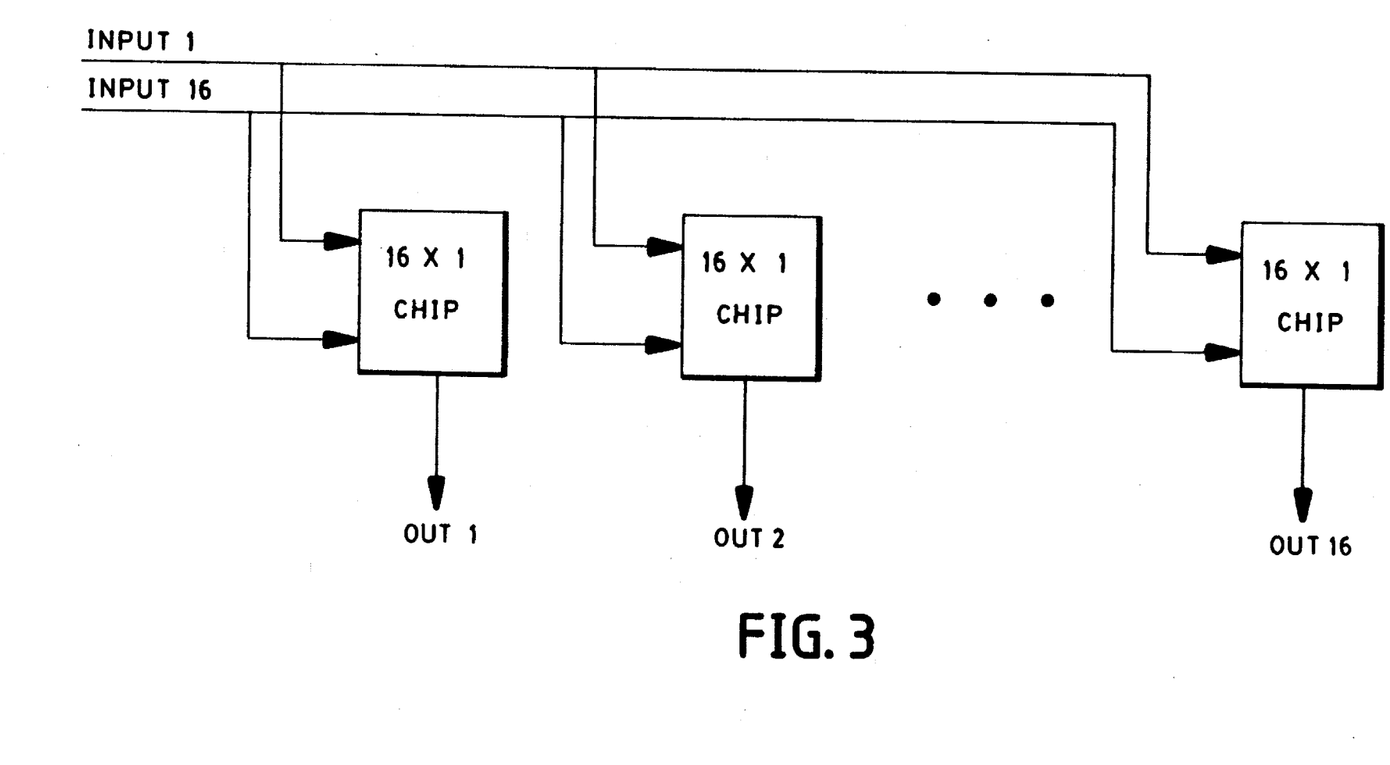
FIG. 3 is a diagrammatic presentation of an output-partitioned ATM shared memory with on-chip CAM control, according to the present invention.

At the present time it is not practical to implement a full 16×16 ATM fabric on a single VLSI chip, hence the fabric must be partitioned so it can be implemented on a two-chip set. Two partitioning alternatives are shown in FIGS. 2 and 3. The architecture of FIG. 2 is partitioned on a bit slice basis and provides full memory sharing. It has the advantage of requiring about ¼ of the memory size compared to the output buffered architecture of FIG. 3. However, a fully shared memory architecture is more complex and requires about ½ of the chip area for control. The architecture of FIG. 3 is partitioned on an output port basis. It therefore becomes an output buffered ATM switch fabric. The buffer associated with each output acts as a shared memory for the priorities destined for that output port. The advantage of this architecture is its relative simplicity and excellent multicasting. The disadvantage is that it requires about four times the buffer size for the same cell loss performance.

Output Buffered ATM Switch

Figure 4:
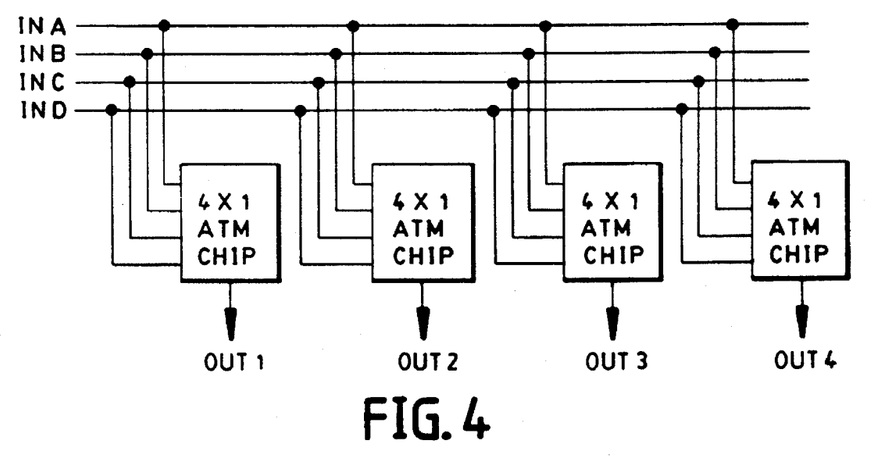
FIG. 4 is a block diagram of a 4×4 ATM output buffered switch using a content addressable memory, according to the present invention.
Figure 5:
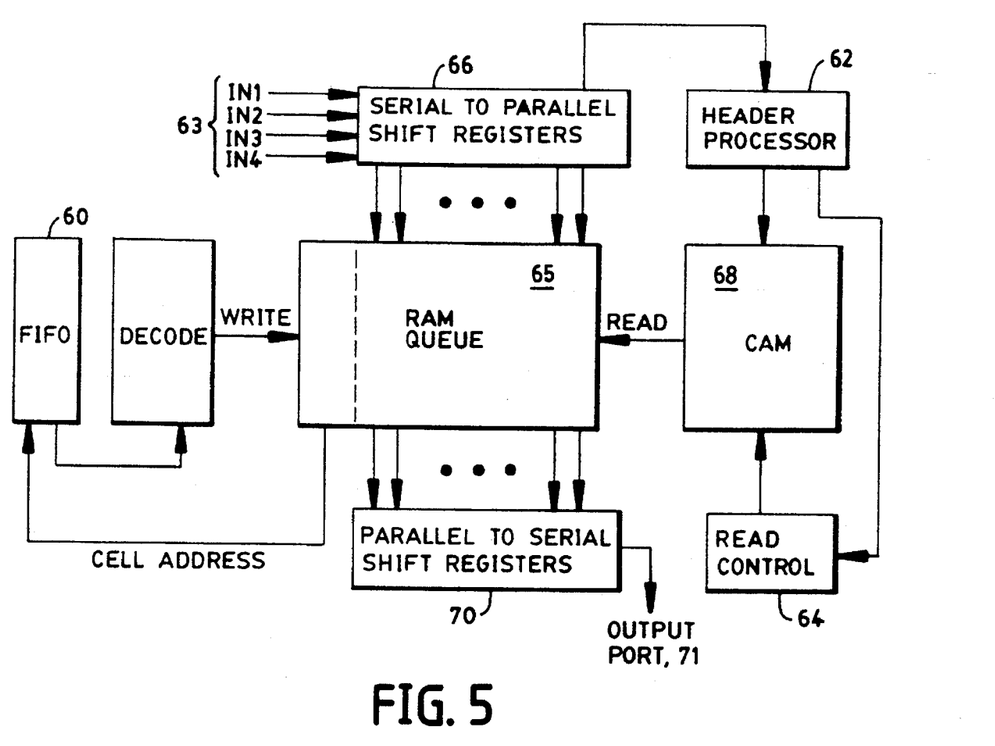
FIG. 5 is a block diagram of a 4×1 ATM test chip, illustrating a switch using a content addressable memory, according to the present invention.

In order to validate the CAM-ATM approach, we implemented the output buffered approach of FIG. 3. The operation is explained with an example of a 4=4 output buffered switch, as shown in FIG. 4. The 4×4 switch is made up of four identical chips, but each is programmed to function as a unique output port. FIG. 5 is a block diagram of a 4×1 ATM test chip, representing one output slice of the 4×4 ATM switch using content addressing, according to the present invention. The 4×1 chip employs a 32 cell output buffer per output port for queuing cells. The output buffer is used as a shared memory for the four priority levels.

Referring to FIG. 5, the header processor 62 processes the headers of input 1–input 4 sequentially. (The header of input 1 is processed first). The first 4 bits of the header determine the cells destination. If bit 1 (left side) is one, the cell will be sent to output 1. If bit 1 is zero, the cell will not be sent to output 1. If 4 bits are ones, then the cell will be sent to all 4 outputs. If all 4 bits are zeros, then the cell will not be sent to any outputs. A 4×4 switch fabric is made with four 4×1 identical chips each externally programmed to accept cells for one output. If the chip accepts a cell, then the header processor 62 assigns an arrival number to the cell. Cells in each of the four priorities have arrival numbers (AN) arranging from 0–31. Having thirty-two numbers assures that cells in the same priority never have the same AN. However, cells can have the same AN but belong to different priority groups. Since cells are identified by their AN and priority code, there is no conflict in identifying cells.

Referring again to FIG. 5, the FIFO 60 stores the address of the empty locations in RAM queue 65. Initially, when all RAM queue locations are empty, the FIFO contains addresses 00000–11111. After the first two cells are written into the RAM queue, the FIFO contains address 00010–1111. After the first cell is read out of the RAM queue, the address (00001) of the emptied RAM queue location is stored in the FIFO. Since the FIFO supplies address sequentially from top to bottom, address 00001 will not be written into until all addresses are used up.

The FIFO is implemented with a dual port RAM having thirty-two locations and a five-bit data bus. A five-bit counter points to the write address. This counter is incremented each time a cell is read out of the RAM queue. A second five-bit counter points to the read address. This counter is incremented each time a cell is written into the RAM queue. During each time slot up to four addresses are read from the FIFO. If the header of the incoming cell is programmed for the output port 71 in the chip, an enable is generated in the header processor allowing the FIFO to supply an address. If the cell's address does not match the chip's address, the enable is zero and the FIFO is prevented from supplying an address during that mini-slot. A mini-slot is the time allotted to process one input.

The operation is started with a pulse which sets and resets appropriate registers. At the end of the pulse, the FIFO 60 stores 00000 through 11111 in sequential order and the registers in the header processor 62 and read control 64 are reset. The switching operation is performed in four steps:

Step 1. All four input cells are shifted into shift registers 66. The header processor 62 interprets the header and assigns an arrival number AN to each valid cell destined for the programmed output port 71.

Step 2. The valid cells are written into RAM queue 65 locations 00000 through 00011 (assuming all four inputs are for the programmed output port) and the arrival numbers AN with their associated priorities are written into locations 00000 through 00011 of the CAM 68. The addresses for writing are supplied by the FIFO 60. Based on the input from the header processor 62 and cells waiting in the queue, the read control 64 supplies to the CAM 68 a pointer which contains the arrival number and priority of the cell to be read from the RAM queue 65.

Step 3. The input from the read control 64 is compared to all locations in the CAM 68 at the same time and a match is found in location N (00000–00011). This causes readout of the cell in location N of the queue 65. Each queue location contains a five-bit cell address, an eight-bit header and a payload (the five-bit cell address is equal to N).

Step 4. The header and the payload of read cells are loaded in parallel into the shift register 70 and shifted out serially. The five-bit cell address is loaded into the FIFO 60 for later use.

Figure 6:
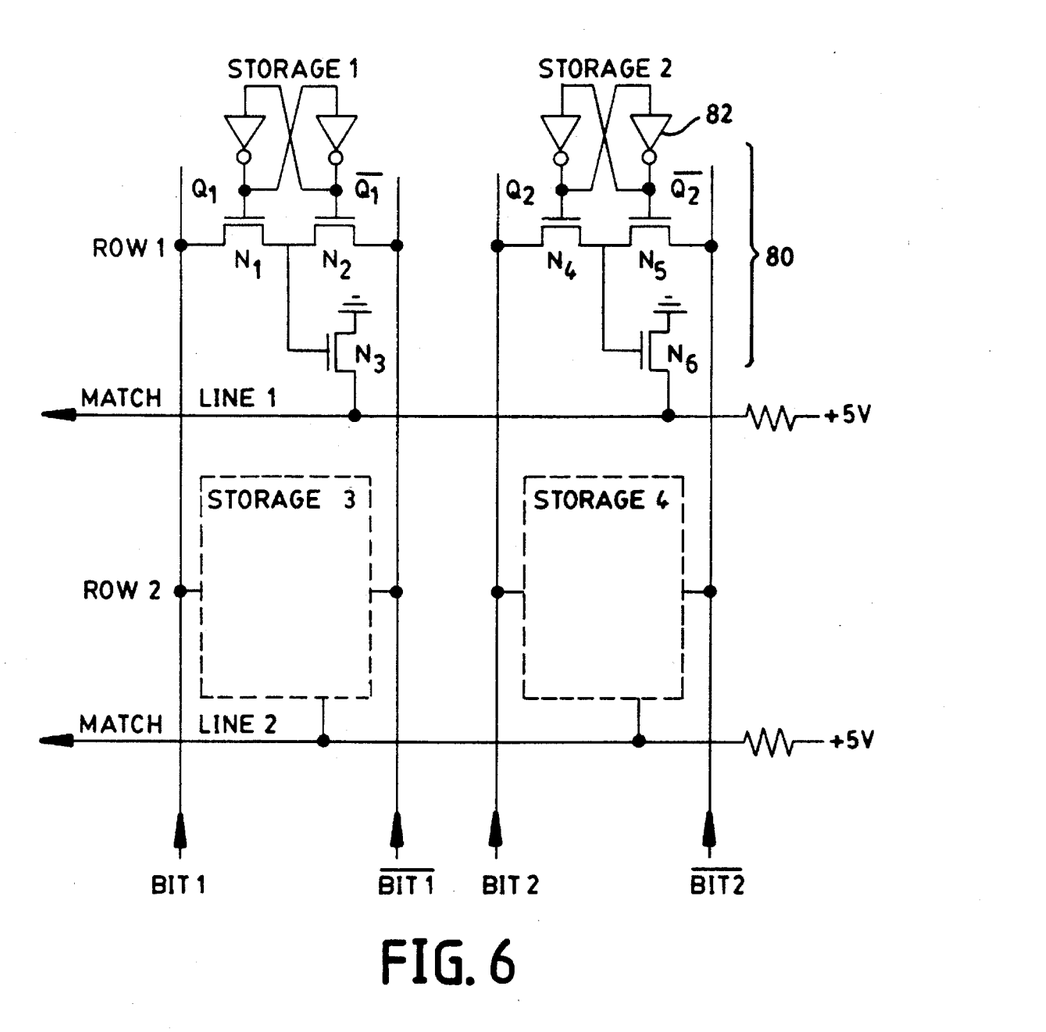
FIG. 6 is a block diagram of the Content Addressable Memory (CAM), according to the present invention.

FIG. 6 is a block diagram of part of the Content Address memory (CAM), according to the present invention. The CAM consists of storage cells 80 with associated comparators 82 using N-type transistors N1–N6 as shown in FIG. 6. When bit 1 is high and Q1 is low, transistor N3 is turned on, preventing match line 1 from being high. Only one combination of bit 1 and bit 2 turns transistors N3 and N6 off, allowing the match line to become high.

Figure 7:
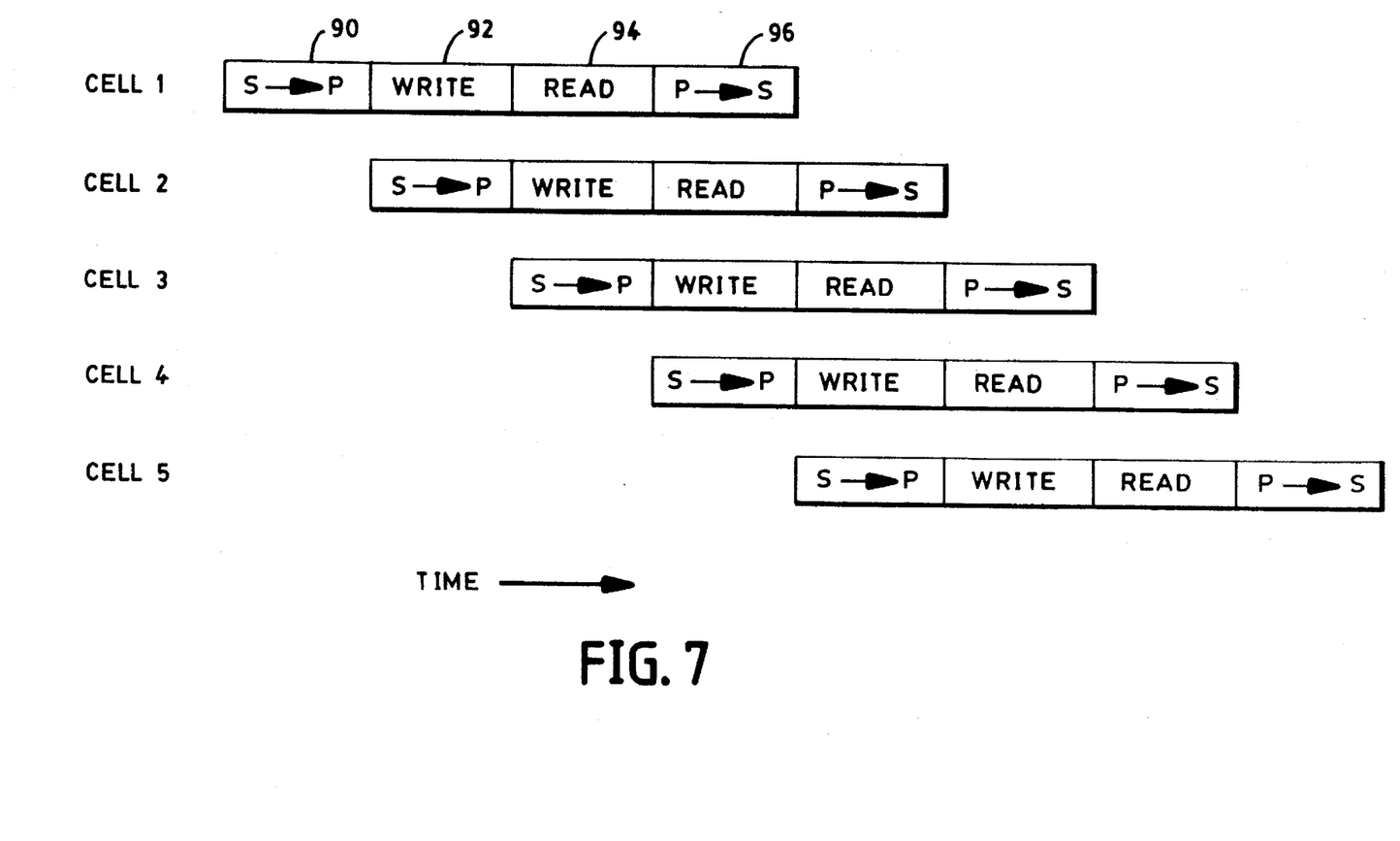
FIG. 7 is a diagrammatic illustration of the sequence of operations of the ATM switch with shared memory of the present invention.

The sequence of operations is shown in FIG. 7. Each cell is converted from serial-to-parallel 90, written to the queue 92, read from the queue 94, and converted from parallel to serial 96. While cell 1 is being written to the queue, cell 2 is being converted from serial to parallel and so on. By overlapping the operations, each cell can come in immediately after the preceding one. This results in multiple operations (i.e., serial-parallel, write to queue, read from queue and parallel-serial) being performed at the same time. The overlapping operations are prevented from interfering with each other by using intermediate storage and a queue with simultaneous read/write capability.

Figure 8:
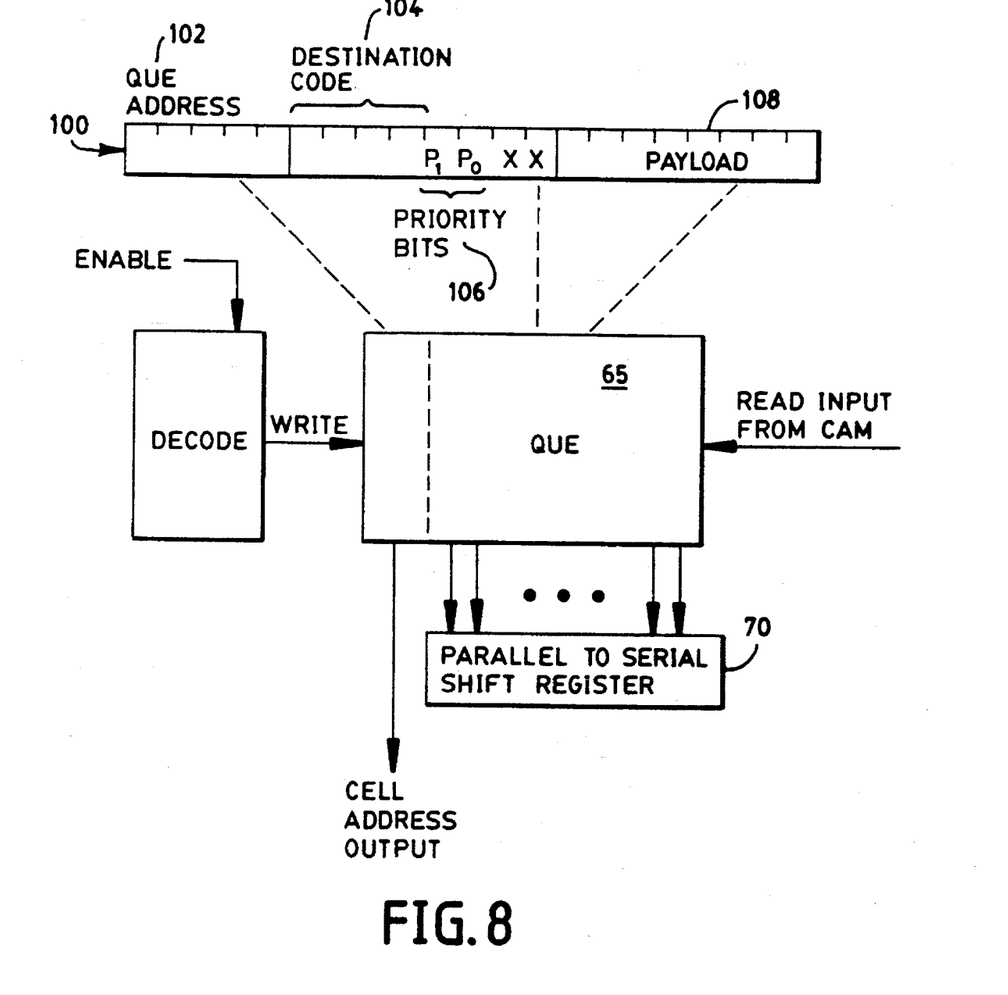
FIG. 8 is a block diagram showing the operation of the RAM queue in the ATM switch of the present invention.

The operation of the RAM queue 65 and the cell 100 format is shown in FIG. 8. The RAM queue utilizing static storage has thirty-three locations each with twenty-one bits. Thirty-two locations are used to store ATM cells and one location stores an idle cell (arbitrarily consisting of alternating ones and zeros) which is sent out when the RAM queue 65 is empty. Each cell 100 consists of the following: 1) five bits indicating the address 102 in the RAM queue 65 where the cell is located. When a cell is read out, this five-bit address is sent to the FIFO 60 (FIG. 5) for future use; 2) an eight-bit header which consists of a four-bit destination code 104 and two priority bits 106; and 3) an eight-bit payload 108. Writing and reading from the RAM queue takes place at the same time (i.e., while up to four cells are written in, one previously stored cell is read out). The header and payload are read in parallel and loaded into an output shift register 70.

What is claimed is:

1. An asynchronous transfer mode shared memory switch comprising:
    means to receive serially a fixed plurality of cells of digital data packets during a specific time period, each packet having a header;
    means to process and temporarily store the header of each said cell;
    means to temporarily store the data bits of each said cell;
    means to assign an arrival number to each cell during processing of said header;
    means to extract the output destination and priority of each cell from said headers;
    a content addressable memory for storing the arrival number, output destination and priority of each data cell;
    means to temporarily store the header and broadcast bits of each said cell;
    means to provide available addresses in said random access memory for the transfer of said cells from said temporary storage to said random access memory, and to store said addresses in said content addressable memory associated with the arrival number, output destination and priority of said data cells;
    a read control means for providing sequentially, in order of priority, arrival numbers, priorities and destination addresses, to said content addressable memory for determining the order in which cells of data are read from said random access memory;
    means to output said cells of data from said random access means under control of said content addressable memory.

2. The asynchronous transfer mode shared memory switch of claim 1, further comprising:
    means to broadcast said data cells to more than one output destination.

3. An asynchronous transfer mode shared memory switch of claim 1, further comprising:
    means to subdivide said arriving cells into categories based on arrival number, priority and output destination; and
    means to sequence the outputting of said cells in order of arrival number, priority and destination number.

4. An asynchronous transfer mode shared memory switch of claim 1, further comprising:
    means to store the addresses of said random access memory from which data has been read out, so that said addresses are available for storage of newly arriving data cells.

5. An asynchronous transfer mode shared memory switch of claim 1, further comprising:
    means to convert said data cells from serial format to a parallel format prior to storage in said random access memory; and
    means to convert said data cells from a parallel format to a serial format prior to outputting said cells.

6. An asynchronous transfer mode switch having a shared memory controlled by a content addressable memory, comprising:
    a plurality of input ports to receive cells of data serially, including means to store temporarily said cells until all bits are received;
    a header processor to receive the headers of said cells serially, including means to store temporarily said headers until all bits are received;
    said header processor having means to assign arrival numbers to said cells;
    means to store priority, broadcast and destination bits from said headers;
    random access memory means to receive said cells of data from said temporary storage and to store said cells;
    means to store available addresses in said random access memory means, and to supply said addresses to said random access memory means;
    a content addressable memory to store the priority, arrival number, and destination output port of each cell stored in said random access memory;
    means to systematically search said content addressable memory with all possible combinations of priority codes, arrival numbers and destination output ports to determine the order of priority for outputting cells from said random access memory;
    means to determine the addresses in said random access memory of cells to be outputted in order of priority; and
    means to readout said cells to their destination output ports serially.

7. The asynchronous transfer mode switch having a shared memory controlled by a content addressable memory of claim 6, wherein said random access memory is fully shared.

8. The asynchronous transfer mode switch having a shared memory controlled by a content addressable memory of claim 6, wherein said random access memory is output buffered.

9. A method of switching cells in an asynchronous transfer mode switch having a shared memory controlled by a content addressable memory, wherein a plurality of cells are to be switched through a single output port comprising the steps of:

receiving a plurality of data cells serially and transferring each of said cells in parallel to a random access memory for storage;

processing the header of each cell and assigning an arrival number to determine its priority and output port destination;

storing said arrival number, priority and output port destination in a content addressable memory;

assigning and storing an address in said random access memory for each incoming cell;

searching said content addressable memory for all combinations of priority, output port destination and arrival number in order of priority;

retrieving the random access memory address for each match found in said content addressable memory;

reading out the cell stored at said random access memory address for outputting at its destination port.

* * * * *